Patented Nov. 18, 1952

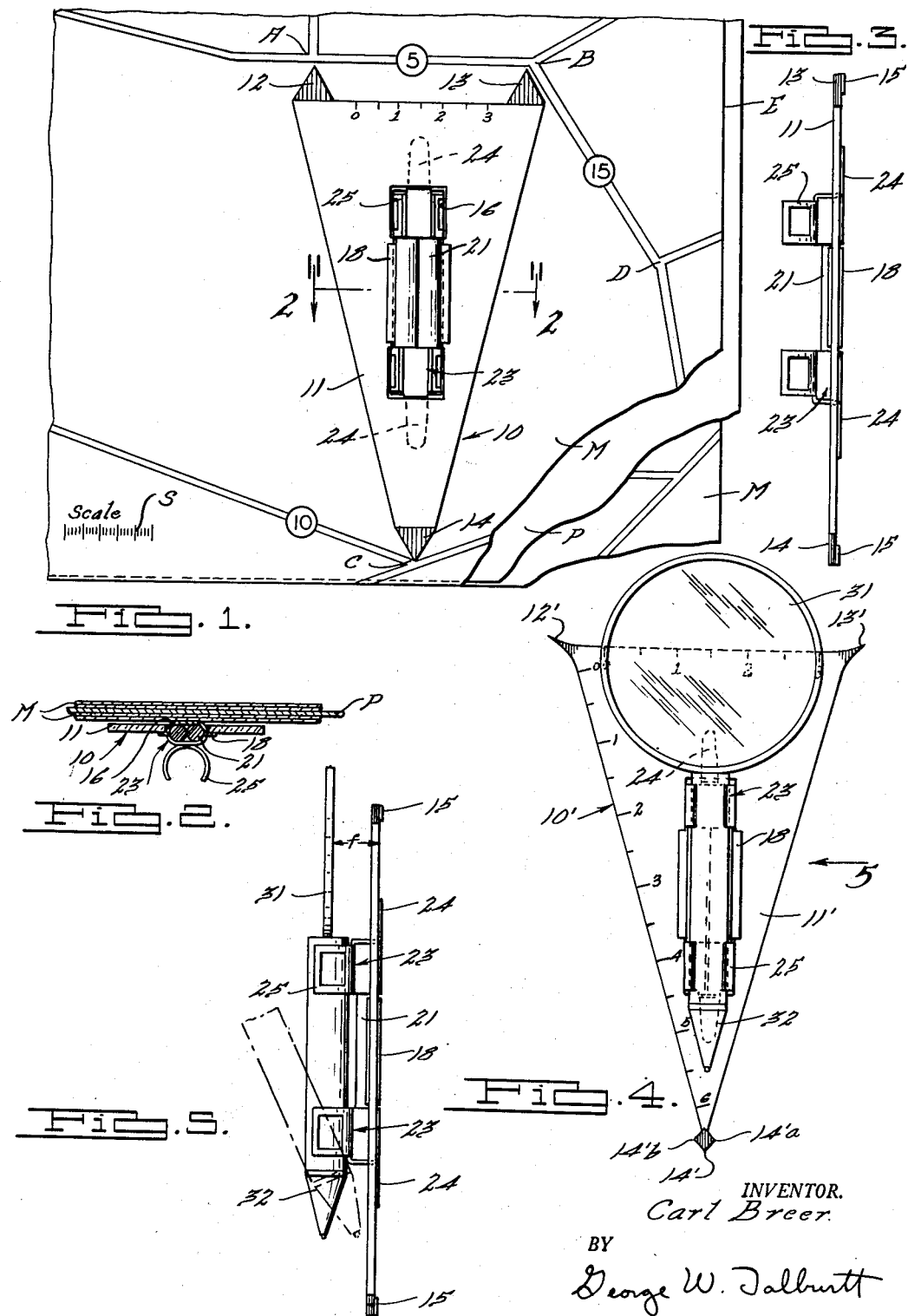

2,618,088

UNITED STATES PATENT OFFICE 2,618,088

ROUTE INDICATOR

Carl Breer, Grosse Pointe, Mich.

Application August 10, 1949, Serial No. 109,584

4 Claims. (Cl. 40—125)

This invention relates to a magnetically supported route indicator for maps or charts, and to the apparatus associated therewith that materially increases the usefulness of the indicator.

The primary object of this invention is to provide a route indicator for a chart or map that will not only hold the map or chart in a properly displayed position but one that will also clearly and distinctly point out a pair of spaced points along the route between which travel is to proceed.

It is another object of this invention to provide a map route indicator that may be quickly and easily mounted along any portion of the route to be traversed, the indicator being so designed that it will remain in its selected position and clearly point out the proposed path of travel so that one observing the map need not appreciably direct his attention from or detract from his other duties when ascertaining his position along the selected route.

It is a further object of this invention to provide a map route indicator that may be directly mounted on a map or chart without concealing large portions of the chart or map, said indicator including magnifying means to enlarge that portion of the map along which travel is progressing.

It is an additional object of this invention to provide a map route indicating device that points out spaced points along the path of travel and includes scale means whereby the distance between these points, or any other points, may be easily and readily ascertained.

Other objects and advantages of this invention will become readily apparent from a reading of the following description and a consideration of the related drawings wherein:

Fig. 1 is a plan view of one form of route indicator shown applied to a map;

Fig. 2 is a fragmentary sectional elevation taken along the line 2—2 of Fig. 1;

Fig. 3 is a side elevation of the route indicator shown in Fig. 1;

Fig. 4 is a plan view of another form of route indicator that has a magnifying glass and a pencil detachably mounted thereon; and Fig. 5 is a side elevational view of the route indicator shown in Fig. 4, the view being taken looking in the direction of the arrow 5 of Fig. 4.

In driving motor vehicles or the like it is frequently desirable to consult a map or chart in order to ascertain one's route of travel as well as one's exact location along the selected route. This invention relates to a device whereby a map or chart may be held on a rigid support in a properly displayed position and the desired route of travel clearly pointed out so that the vehicle driver may quickly and conveniently ascertain his position and his prospective route without materially diverting his attention from his driving duties. In addition to indicating the route of travel this device has associated therewith a rigid support for the map or chart which facilitates handling of the map or mounting of the map in an easily observable position.

Figs. 1, 2 and 3 of the drawings show one form of the invention wherein a map M is mounted on a rigid plate P the plate being formed from some magnetizable material such as iron or steel or alloys thereof. Preferably the map M is folded so as to form a pocket or an envelop with an opening along one edge, such as the edge E, into which the plate P may be slidably inserted. When the plate P is mounted between the folds of the map M in the manner shown, the map will be stretched out flat in a properly displayed, easily observed position. Furthermore, the rigid plate support P for the map provides a mounting means for the map that makes it easy to handle and/or suitable for support in a bracket or the like where it may be quickly and easily observed.

Mounted on the map M is one form of route indicator 10. The indicator 10 includes the flat, triangular-shaped plate 11 which is preferably formed from some transparent plastic material or the like. Plate 11 has the corners thereof shaped to provide the pointers 12, 13 and 14 respectively. The pointers 12—14 may be of a brightly colored plastic material to make them clearly stand out against the transparent body portion of plate 11. The underside of the pointers 12—14 may be covered with a slip resistant coating 15 such as rubber or the equivalent thereof. The purpose of this slip resistant coating will become readily apparent from the following description of the route indicator. It should be pointed out that such a slip resistant coating for the pointers is not an absolute necessity and that it can be omitted without materially affecting the operability of the route indicating device however such a coating has been found to be quite advantageous. An opening 16 extends through the central portion of plate 11 and bridging this opening 16 is a U-shaped clip 18. Mounted in the opening 16 and supported on the clip member 18 is one or more permanent magnets 21. Secured about the magnets 21, preferably adjacent each end thereof, are a plurality of anchor clips 23. Clips 23 have fingers 24 that project outwardly therefrom that are adapted to be bent to provide a step formation that may be firmly engaged with the underside of the plate 11. As a result of the clip member 18 bridging the opening 16 and supporting the magnets 21 from the underside thereof, and the anchor clips 23 extending about the upperside of the magnets 21 and having their fingers 24 bent downwardly through the plate opening 16 and against the underside of plate 11, it is obvious that the magnets 21 will be lockingly engaged with the plate 11. The particular manner herein disclosed for fastening the magnets 21 to the plate 11 renders assembly of the route indicator unit extremely simple and economical. Obviously other methods of mounting the magnets 21 on the plate 11 may be used that will be the equivalent of that herein disclosed. The clips 23 may also include spring clasp members 25. Clasp members 25 are adapted to releasably support a pencil, pen, magnifying glass, additional magnets or any other suitably sized object that might be required or that might be found to be convenient or handy to have associated with the route indicator.

The plate portion 11 of the indicator 10, between the pointers 12 and 13, is marked to provide a linear scale or ruler so that the distance between various points along the travel route may be readily ascertained. By measuring the distance between any two points such as A and B or B and C on the travel route with the indicator ruler then transposing this measurement to the map scale S, it is a simple matter to determine the exact distance between various points on the map. If desired a scale may be provided along all three sides of the plate 11. In addition to using the scale markings along the edge of the plate 11 to determine distances between spaced route points, one may also use the indicator pointers 12-14 to determine distances between spaced points along the travel route. This is accomplished by merely placing plate 11 over the map scale S and first determining the distances between the spaced pointers 12 and 13, 13 and 14 and 14 and 12. Knowing the distance between the pointers 12 and 13 to be for example 100 miles on the map M, it is quite obvious that points A and B are 100 miles apart. With this fact established it is easy to estimate the location between points intermediate the points A and B. If a longer travel route span is desired to be covered, obviously the side edge of the plate 11 between the pointers 12 or 13 and the pointer 14 can be placed along the travel route.

In using the route indicating device herein disclosed the map M is preferably first folded to provide an open ended pocket into which the plate P can be inserted, that portion of the map over which travel is to proceed being left exposed. Then the plate P is inserted in the pocket and thereafter the magnet supporting route indicator 10 is placed on the map along that portion of the route over which travel is to begin. The magnetic forces that are set up between the magnets 21 and the magnetizable plate P hold the indicator 10 to the plate P and to the map M and retain the indicator 10 in position along the selected travel route. Furthermore, the anchoring of the indicator 10 to the plate P by the magnetic forces existing therebetween also anchors the map M to the plate P. If a small chart or map is being used, such as one that can not be folded to form a plate receiving pocket for the plate P, still the indicator 10 will firmly anchor the map or chart to the support plate P and retain the map in a properly displayed position. Once attached to the map M and plate P the indicator 10 clings thereto and clearly points out the travel route and renders driving and map reading a relatively simple matter. Obviously, as travel progresses the indicator 10 can be moved along the travel route to any desired new location.

It is quite possible that two or more indicators may be supplied with the plate P as part of a kit and the indicators not being used to actually point out the travel route may be used to fasten down the edge portions of the map M to the plate P so that the map will always be held in a stretched out properly displayed position where it can be quickly and accurately observed.

Figs. 4 and 5 show a modified form of the invention. In this form of the invention all elements of the route indicator 10', that are identical to similar elements of the indicator 10 shown in Figs. 1-3, bear the same reference numerals and therefore a repetition of their description will be omitted. The route indicator 10' shown in Figs. 4 and 5 comprises a plate 11' of transparent material having indicators 12', 13' and 14' respectively. The indicators 12' and 13' are so shaped that they may be used to indicate routes along either side of the plate 11' adjacent thereto. The pointer 14' is formed with a pair of oppositely positioned indicators 14'a and 14'b which are arranged to cooperate respectively with the pointers 12' and 13'. Both the long and short sides of plate 11' are marked with linear scales so that either of these edges of the plate 11' may be used to measure the distance between various points along the travel route. The magnets 21 are mounted in the plate 11' in a manner identical to that described for the indicator 10 shown in Figs. 1-3.

Mounted in the spring clasp members 25 of the indicator 10' is a magnifying glass 31 having a pencil 32 formed in the handle portion thereof. The magnifying glass 31 is so positioned that it normally enlarges that portion of the map that is located between the pointers 12' and 13'. The magnifying glass 31 is preferably one having a focal height $f$ equal to the elevation of the glass 31 above the plate 11' so that the glass 31 is properly focused on the map M when it is mounted in the spring clasps 25. However, due to the spring clasps 25 providing releasable pivot points for the handle portion of the magnifying glass 31, it is possible to swing the glass 31 about either one of the clasps 25 to a position such as that indicated by the broken lines in Fig. 5. Such action permits modification of the focus of the glass 31 to suit the vision of the person using the glass. Obviously the glass 31 may be completely detached from the clasps 25 to permit use of the glass for viewing any portion of the map or chart and to permit use of the pencil 32 to mark the map or record information or the like.

From the foregoing it is thought to be obvious that the device herein disclosed renders map reading an easy, simple matter and furthermore this device permits the vehicle driver to devote practically his entire attention to his driving duties thus materially reducing the danger of accidents.

I claim:

1. A device for displaying a map or the like comprising in combination a support of magnetizable material and a route indicator adapted to be mounted on said plate by means of magnetic attraction, said indicator comprising a plate-like, triangularly shaped, transparent member provided with outwardly extending, co-planar pointers projecting from the side edges thereof at each vertex thereof and an opening piercing the central portion thereof, a magnet mounted in said opening, and a linear scale mounted on and extending along at least one side edge of said triangular shaped member between a pair of said pointers.

2. An indicator unit adapted to be mounted on a support formed of magnetizable material comprising a substantially, straight-edged, triangularly shaped, transparent plate formed to provide a pair of offset, outwardly projecting, substantially triangularly shaped pointers projecting from the side edges of the plate at two of the vertices thereof and a rectangularly shaped offset, outwardly projecting pointer projecting from the side edges of the plate at the other vertex thereof, said plate having an opening piercing the central portion thereof and having a permanent magnet mounted therein.

3. An indicator unit adapted to be mounted on a support formed of magnetizable material comprising a substantially, straight-edged, triangularly shaped plate formed with scale means thereon to provide graduated side edges and a pair of substantially triangularly shaped pointers projecting outwardly from the side edges thereof in offset relationship at two of the vertices thereof and a rectangularly shaped pointer projecting outwardly from the side edges thereof in offset relationship at the other vertex of the plate, said plate having an opening piercing the central portion thereof and having mounted therein a permanent magnet, said magnet including a clip means to provide for the mounting of auxiliary equipment on said unit.

4. A device for displaying a map or the like comprising in combination a base member of magnetizable material and a map route indicator adapted to be mounted on said base member by means of magnetic attraction, said route indicator comprising a triangularly shaped, transparent plate having lineal scale means marked off along the side edges thereof adapted to be arranged along the route of travel, the said plate including offset, outwardly projecting pointers on the side edges of the plate adjacent the vertices thereof adapted to define offset marker points between which travel is to progress, and a permanent magnet mounted on said indicator adapted to urge said indicator against said base member and to clampingly engage said map therebetween.

CARL BREER.

REFERENCES CITED

The following references are of record in the file of this patent:

UNITED STATES PATENTS

| Number | Name | Date |
|---|---|---|
| 591,804 | Barrie | Oct. 19, 1897 |
| 1,594,822 | Elam | Aug. 3, 1926 |
| 1,845,449 | Smith | Feb. 16, 1932 |
| 2,254,498 | Scharf | Sept. 2, 1941 |
| 2,330,951 | Burmester | Oct. 5, 1942 |
| 2,355,161 | Holstein | Aug. 8, 1944 |
| 2,431,827 | Rado | Dec. 2, 1947 |

FOREIGN PATENTS

| Number | Country | Date |
|---|---|---|
| 19,908 | Great Britain | of 1904 |